US005166518A

United States Patent [19]

Freedman

[11] Patent Number: 5,166,518

[45] Date of Patent: Nov. 24, 1992

[54] MASS SPECTROMETER WITH ELECTROSTATIC ENERGY FILTER

[75] Inventor: Philip A. Freedman, Northwich, England

[73] Assignee: Fisons Plc, Ipswich, England

[21] Appl. No.: 804,361

[22] Filed: Dec. 9, 1991

[30] Foreign Application Priority Data

Dec. 10, 1990 [GB] United Kingdom ................ 9026777

[51] Int. Cl.[5] ........................ B01D 59/44; H01J 49/00

[52] U.S. Cl. .................................... 250/296; 250/297

[58] Field of Search ................ 250/281, 295, 296, 297

[56] References Cited

U.S. PATENT DOCUMENTS 3,233,099 2/1966 Berry et al. .
3,886,357 5/1975 Naito .................................. 250/296
3,950,691 4/1976 Evans .................................. 250/296
4,766,314 8/1988 Jung .................................. 250/296

FOREIGN PATENT DOCUMENTS 1051618A 8/1981 U.S.S.R. .

OTHER PUBLICATIONS

Retardation Lens Used to Improve the Abundance Sensitivity of a Mass Spectrometer, Freeman, Daly and Powell, *Rev-Sci. Instrum.* 1967, vol. 38(7), pp. 945–948.

Ion-Retarding Lens to Improve the Abundance Sensitivity of Tandem Mass Spectrometers, Kaiser and Stevens, *AEC Research and Development Report*, Nov. 1967.

Ion Focusing Properties of a "Thick" Retardation Lens, Merrill, Calkins and Peterson, *Twenty-Seventh Annual Conference on Mass Spectrometry and Allied Topics*, Jun. 3–8, 1979, pp. 334–335.

A Three Stage Mass Spectrometer, White, Rourke and Sheffield, *Applied Spectroscopy*, Nov. 2, 1958, pp. 46–53.

The Vg Sector 54 With 30cm Electrostatic Filter for High Abundance Sensitivity Measurements of Very Low Abundance Isotopes, Palacz & Walder, *Adv. Mass Spectrom*, UK, 11 Apr. 1990.

Mass Spectrometer with Electrostatic and Magnetic Prisms, Kel'man, Rodnikova and Uteev, *Soviet Physics-Doklady*, vol. 14, No. 2, Aug. 1969, pp. 155–157.

Prism Mass Spectrometer with Energy Focusing, Kel'man, Rodnikova and Finogenov, *Soviet Physics—Technical Physics*, vol. 16, No. 1, Jul. 1971, pp. 130–135.

Advantages of a Second Electric Sector on a Double-Focusing Mass Spectrometer of Reversed Configuration, Gilhaus, Boyd, et al., *International Journal of Mass Spectrometry and Ion Process*, 67 (1985), pp. 209–227.

*Primary Examiner*—Bruce C. Anderson
*Attorney, Agent, or Firm*—Merchant, Gould, Smith, Edell, Welter & Schmidt

[57] ABSTRACT

A mass spectrometer comprising ion source means (1) for producing ions characteristic of a sample to be analysed; ion detector means (14) for receiving at least some of said ions; magnetic sector analyzing means (18) and electrostatic analyzing means (8) disposed in any order between said ion source means (1) and said ion detector means (14); wherein said magnetic sector analyzing means (18) comprises means for dispersing ions according to their mass-to-charge ratios and for transmitting ions whose mass-to-charge ratios lie within a predetermined range and have a first kinetic energy; said electrostatic analyzing means (8) comprises means for generating an electrostatic field for deflecting ions having different kinetic energies around different curved trajectories such that ions having a second kinetic energy, lower than said first kinetic energy, are deflected around a central curved trajectory (15) and transmitted through said electrostatic analyzing means (8), and the strength of said electrostatic field is substantially equal to the strength of a similar reference field multiplied by the ratio of said second and said first kinetic energies when the strength of said reference field is that necessary to deflect ions having said first kinetic energy around said central curved trajectory (15); and means (11) are provided prior to said magnetic sector analyzing means for changing the kinetic energy of ions to said first kinetic energy and (4) prior to said electrostatic analyzing means for changing the kinetic energy of ions to said second kinetic energy.

21 Claims, 5 Drawing Sheets

MASS SPECTROMETER WITH ELECTROSTATIC ENERGY FILTER

Figure 1:
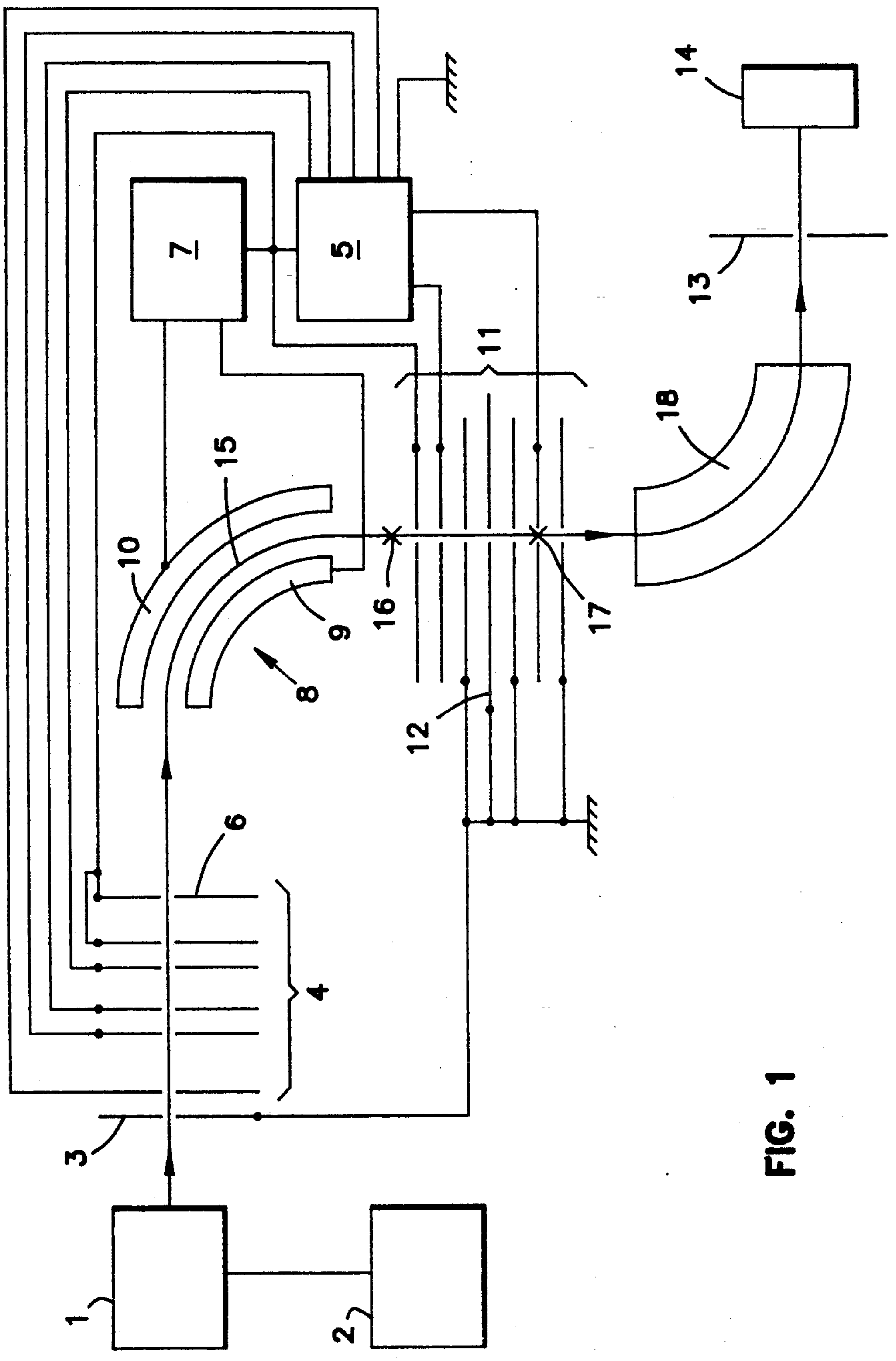

This invention relates to magnetic sector mass spectrometers fitted with electrostatic ion energy filters, and in particular to such spectrometers used for isotopic ratio determinations.

When a mass spectrometer is used for the determination of isotopic ratios it is frequently necessary to accurately determine the intensity of two peaks in the mass spectrum of a sample which are separated only by 1 or 2 daltons. In some cases, the two peaks may differ in intensity by a factor of more than $10^5$ (eg the determination of the ratio of $^{230}$Th and $^{232}$Th) and a mass spectrometer having a very good abundance sensitivity is necessary to ensure that the tail of the very large major isotope peak, which in conventional mass spectrometers is likely to extend several mass units on either side of the peak, does not interfere with the intensity measurement of the smaller isotope. When the ratio of peak heights to be determined is more than a factor of $10^5$, it is obvious that when the spectrometer is tuned to the minor peak, the signal from the nearby major peak must be at a very low level indeed if the accuracy of measurement is not to be compromised. The mass analyzer, typically a magnetic sector analyzer, must therefore have as high a dispersion as possible so that the maximum separation between adjacent mass peaks is achieved.

In practice, there is a limit to the improvement in abundance sensitivity which can be made by increasing dispersion. Important limitations arise because the energy imparted to ions on their formation is never exactly the same and because of the loss of energy suffered by some ions during their passage through the spectrometer through collisions with gas molecules. Both of these effects cause broadening of the mass peaks, and it is necessary to use some form of energy filtration in order to further improve the abundance sensitivity. The best approach to eliminating the effect of the initial energy spread of the ions is to use an electrostatic energy analyzer, typically a sector analyzer, which cooperates with the magnetic sector analyzer to produce an image of the ion source which is both direction and energy focused, ie, to provide a double-focusing mass spectrometer. Unlike double-focusing mass spectrometers used for organic analysis, a spectrometer used for isotopic analysis does not require a very high mass range or high mass resolution, but as explained it must have high mass dispersion and therefore requires a magnetic sector analyzer o±large radius. This implies that the radius of the energy analyzer must also be large because of the limitation on geometrical design imposed by the double-focusing arrangement. Thus prior isotopic-ratio double-focusing mass spectrometers are generally very large and expensive to construct.

The second problem, that of ion-energy loss through collision with neutral molecules, has been reduced by fitting an electrostatic filter between the final image plane of the spectrometer and the ion collector. This is set to prevent ions which have lost energy reaching the collector. On a multi-collector spectrometer, such filtration can as a practical matter only be fitted to one of the collectors, typically the one used for the smallest intensity peak, so that low energy ions associated with an intense higher mass peak do not reach the collector. Such a filter may comprise a simple retarding filter comprising a potential barrier approximately equal to the accelerating potential of the spectrometer, for example as described by Freeman, Daly and Powell (Rev. Sci. Instrum. 1967 38 (7) pp 945–948), Kaiser and Stevens (Argonne Nat. Lab. Report ANL 7393, Nov. 1967), and Merrill, Calkins and Peterson, (27th An. Conf. on Mass Spectrom. and Allied Topics, Seattle, June 1979 pp 334–335).

An alternative approach is to fit a cylindrical sector or spherical sector electrostatic analyzer after the magnetic sector analyzer, for example as in the three stage mass spectrometer described by White, Rourke and Sheffield (Applied Spectroscopy, 1958 (2) p 46–48) and the commercially available two-stage spectrometer model "sector 54–30" produced by VG Isotech Ltd and described by Palacz and Walder at a meeting entitled "Advances in Inorganic Mass Spectrometry", held at Egham, UK, on 11th Apr. 1990. Although comprising combinations of magnetic and electrostatic fields, these instruments are not double focusing, but rather are magnetic sector spectrometers fitted with efficient electrostatic filters for improving abundance sensitivity. As in the case of the double-focusing instruments, however, the radius of the electrostatic sector must still be large when the radius of the magnetic sector analyzer is large.

Other prior art relevant to this invention includes the prism mass spectrometer disclosed by Kel'man, Rodnikova and Uteev in Sov. Phys. Doklady 1969 vol 14 (2) pp 155–157, and Kel'man, Rodnikova and Finogenov in Sov. Phys. Tek. Phys, 1971, vol 16 (1) pp 130–135 and other papers. the mass spectrometers disclosed by Borishin, et.al. in USSR patent 1051618, the mass spectrometer disclosed by Berry et.al. in U.S. Pat. No. 3,233,099, and the multiple sector mass spectrometer disclosed by Guilhaus, Boyd et.al. in Int. J. Mass Spectrometry and Ion Proc. 1985 vol 167 pp 209–227.

It is an object of the present invention to provide mass spectrometers having at least an electrostatic energy analyzer and a magnetic sector analyzer which are more compact than prior spectrometers. It is a further object to provide compact double-focusing mass spectrometers, particularly spectrometers suitable for the determination of isotopic ratios. It is yet another object to provide such spectrometers with high abundance sensitivity.

The invention provides a mass spectrometer comprising:

1) ion source means for producing ions characteristic of a sample to be analysed;
2) ion detector means for receiving at least some of said ions;
3) magnetic sector analyzing means and electrostatic analyzing means disposed in any order between said ion source means and said ion detector means; wherein:
   1) said magnetic sector analyzing means comprises means for dispersing ions according to their mass-to-charge ratios and for transmitting ions whose mass-to-charge ratios lie within a predetermined range and have a first kinetic energy;
   2) said electrostatic analyzing means comprises means for generating an electrostatic field for deflecting ions having different kinetic energies around different curved trajectories such that:
      a) ions having a second kinetic energy, lower than said first kinetic energy, are deflected around a central curved trajectory and transmitted through said electrostatic analyzing means, and b) the strength of said electrostatic field is substantially equal to the strength of a similar reference field multiplied by the ratio of said second and said first kinetic energies when the strength of said reference field is that necessary to deflect ions having said first kinetic energy around said central curved trajectory; and 4) means are provided prior to said magnetic sector analyzing means for changing the kinetic energy of ions to said first kinetic energy and prior to said electrostatic analyzing means for changing the kinetic energy of ions to said second kinetic energy.

Conveniently, the electrostatic analyzing means may comprise an electrostatic sector analyzer e.g., part-cylindrical or part-spherical) so that the electrostatic field is a radial field whose strength is defined by the potential difference between two curved electrodes. Conventionally, such an analyzer is operated with a positive potential on one electrode and a negative potential on the other so that the potential along the central trajectory between the electrodes is zero. In prior mass spectrometers having both magnetic sector and electrostatic analyzers, ions formed in the ion source (maintained at a high potential) are accelerated to a particular kinetic energy, usually by passage through an aperture in a grounded electrode, and then pass through both analyzers at that energy. In such a case the potential of the central trajectories of both analyzers will be ground. In a spectrometer according to the invention, however, the potential of the central trajectory of the electrostatic analyzer may typically be raised substantially above ground by suitable potentials applied to its electrodes, while the potential of the flight tube and the central trajectory of the magnetic sector analyzer remains at ground. Thus in an instrument where the magnetic sector precedes the electrostatic analyzer, the ions produced in the source may be accelerated to a first kinetic energy by passage through an aperture in a grounded electrode and then are dispersed according to their mass-to-charge ratios by the magnetic sector analyzer. Ions having mass-to-charge ratios in the desired range then pass into the electrostatic analyzer but are decelerated to a second kinetic energy as they enter the field because the potential of the central trajectory of the analyzer is maintained above ground. After energy analysis in this analyzer they pass to a conventional ion detector. Alternatively, if the electrostatic analyzer precedes the magnetic sector analyzer, the ions will be accelerated on leaving the electrostatic analyzer and entering the magnetic sector analyzer.

Preferably, but not essentially, the electrostatic analyzer and the magnetic sector analyzer are arranged to co-operate to provide both energy and direction focusing of the ion beam in the manner of a double-focusing mass spectrometer. The change in ion energy between the sectors may make it difficult to compensate certain aberrations as effectively as can be done in a conventional double-focusing spectrometer, and this may result in a lower ultimate mass resolution. However, in many applications, particularly is isotopic-ratio mass spectrometry, this is not important because the abundance sensitivity is determined mainly by the dispersion which is not reduced by the use of a reduced radius electrostatic analyzer as described. The invention therefore enables a small isotopic-ratio mass spectrometer having an abundance sensitivity at least as high as much larger conventional instruments to be produced at lower cost, but its use is not restricted to this field of application.

In one preferred embodiment, the invention provides a mass spectrometer as defined above wherein said electrostatic analyzer means precedes said magnetic sector analyzing means and wherein:

a) said ion source means is maintained at a first potential with respect to ground;

b) the central trajectory of the electrostatic analyzing means is maintained at a second potential with respect to ground whereby ions entering it acquire a second kinetic energy equivalent to the difference between said first and second potentials;

c) the entrance aperture of the magnetic sector analyzing means is maintained at substantially ground potential whereby ions entering it from the electrostatic analyzing means acquire a first kinetic energy equivalent to the first potential.

In another preferred embodiment, the invention provides a mass spectrometer wherein said magnetic sector analyzing means precedes said electrostatic analyzing means and wherein:

a) said ion source means is maintained at a first potential with respect to ground;

b) the entrance aperture of the magnetic sector analyzing means is maintained substantially at ground potential whereby ions entering it from said ion source means are accelerated to a first kinetic energy equivalent to said first potential, and c) the central trajectory of the electrostatic analyzing means is maintained at a second potential with respect to ground whereby ions entering it from said magnetic sector analyzing means are decelerated to a second kinetic energy equivalent to the difference between said first and said second potentials.

In the latter embodiment advantage may be had in some cases if the magnetic sector analyzer analyzing means and the electrostatic analyzing means do not co-operate in the manner of a double-focusing mass spectrometer. For example, the invention may provide a compact electrostatic energy filter which may be installed after the final collector aperture in a conventional isotopic-ratio spectrometer to improve the abundance sensitivity, replacing the more conventional energy filters used on prior instruments of this type. In such a case, the magnetic sector analyzing means of the invention may form only part of the spectrometer installed between the ion source means and the electrostatic analyzing means. In these prior instruments, tandem configurations comprising two magnetic sector analyzers or double-focusing spectrometers comprising at least one magnetic sector analyzer and an electrostatic analyzer were often employed, and it will be understood that the invention extends to the use of these known combinations prior to the electrostatic analyzing means. The invention further extends to any multiple analyzer spectrometer wherein at least one of the electrostatic analyzers is operated as described to transmit ions at a Lower kinetic energy than that transmitted by at least one of the magnetic sector analyzers.

In further preferred embodiments, lens means, typically electrostatic, are provided at the points where the ion energy is changed; for example between the magnetic sector analyzing means and the electrostatic analyzing means. The design of such lenses may follow conventional practice. Use of such lenses may improve the ion transmission efficiency by minimizing, for example, excessive expansion of the ion beam during retardation. Typically the lenses will have unit magnification.

According to the invention ions enter the electrostatic analyzer at a second kinetic energy which is lower than the energy at which they are analyzed in the magnetic sector analyzer (the first kinetic energy). The strength of the electrostatic field needed to deflect ions having the second kinetic energy round the central trajectory of the electrostatic analyzer is equal to that needed in a reference analyzer (ie, an analyzer of the same radius operating to deflect ions of the first kinetic energy round its central trajectory) multiplied by the ratio of the second to the first kinetic energy. This requirement, and other aspects of the invention, may be better understood from the example of a double-focusing spectrometer with a magnetic sector of radius 50 cm operating with an accelerating potential of 5000 volts (ie, with 5000 volts applied to the source). If the spread in energy of the ions produced by the source is 10 eV, the energy dispersion of the magnetic sector would be $$\frac{10}{5000} \times 500 = 1 \text{ mm}$$

and the energy of the ions being analyzed (the first kinetic energy) would be 5000 V (assuming that the ions are singly charged and that the entrance aperture of the magnetic sector is grounded). In a conventional double-focusing spectrometer the electrostatic analyzer must have the same energy dispersion (1 mm) so that its radius must be $$\frac{5000}{10} \times 1 = 500 \text{ mm.}$$

If, however, the potential of the central trajectory of the electrostatic analyzer is not zero but is made 4000 volts by application of suitable potentials to its electrodes, the ions will be retarded from 5000 eV energy to a second kinetic energy of 1000 eV. The energy spread will still remain at 10 eV, however, so that the radius of the electrostatic analyzer now required to compensate the 1 mm energy dispersion of the magnetic sector will be $$\frac{1000}{10} \times 1 = 100 \text{ mm.}$$

However, the radius of a sector analyzer is given by 2V/E, where V is the energy of the ions deflected along the central trajectory and E is the field strength between the electrodes of the analyzer. In the example case, both the radius and the energy have been reduced by a factor of 5 to maintain the dispersion, so the value of E must therefore be the same for both the full size and the reduced radius analyzers. If, however, ions of the full 5000 eV energy were to be deflected around the central trajectory of the reduced radius analyzer, the field strength E would have to be increased by a factor of 5. The converse of this example leads to the requirement of the invention, namely that the field in the electrostatic analyzer is that of the "reference" analyzer multiplied by the ratio of the kinetic energies of the ions in the electrostatic and magnetic analyzers, where the "reference" analyzer is one of the same radius operated at the kinetic energy the ions have during their passage through the magnetic sector analyzer. It is this requirement that distinguishes the present invention from the type of spectrometer exemplified in Soviet patent 1,051,618 wherein the potential of the central trajectory of the electrostatic analyzer may also be maintained different from ground, but the potential difference between the electrodes, and therefore the field strength, is maintained constant. Thus, is this prior spectrometer the field strength is not changed when the ratio of the first to the second kinetic energies is changed, in contrast to the present invention. It is the fact that the field strength is constant in the prior spectrometer which results in the change of focal length with central trajectory potential. A spectrometer similar in principle to that of SU 1,051,618 is disclosed by Berry in U.S. Pat. No. 3,233,099 and is distinguished in the same way.

The present invention also distinguishes over the prism mass spectrometers of Kel'man, which incorporate an electrostatic analyzer having a least one section through which ions travel at an energy which differs from that at which they are mass analyzed. In the prism spectrometers, this section is a field free region which does not disperse the ions according to their energy, so that this prism spectrometer does not anticipate the present invention.

The present invention is also distinguished from the type of spectrometer disclosed by Guilhaus, wherein ions are decomposed in a collision cell between the magnetic and electrostatic sectors. In these spectrometers, which are well known in the field of organic mass spectrometry, the fragment ions obviously acquire on their formation a Lower kinetic energy than their heavier parent ion, and may therefore be analyzed by an electrostatic analyzer whose central trajectory is not at ground potential. This analyzer rejects any unfragmented parent ions and does not anticipate the present invention.

Figure 2:
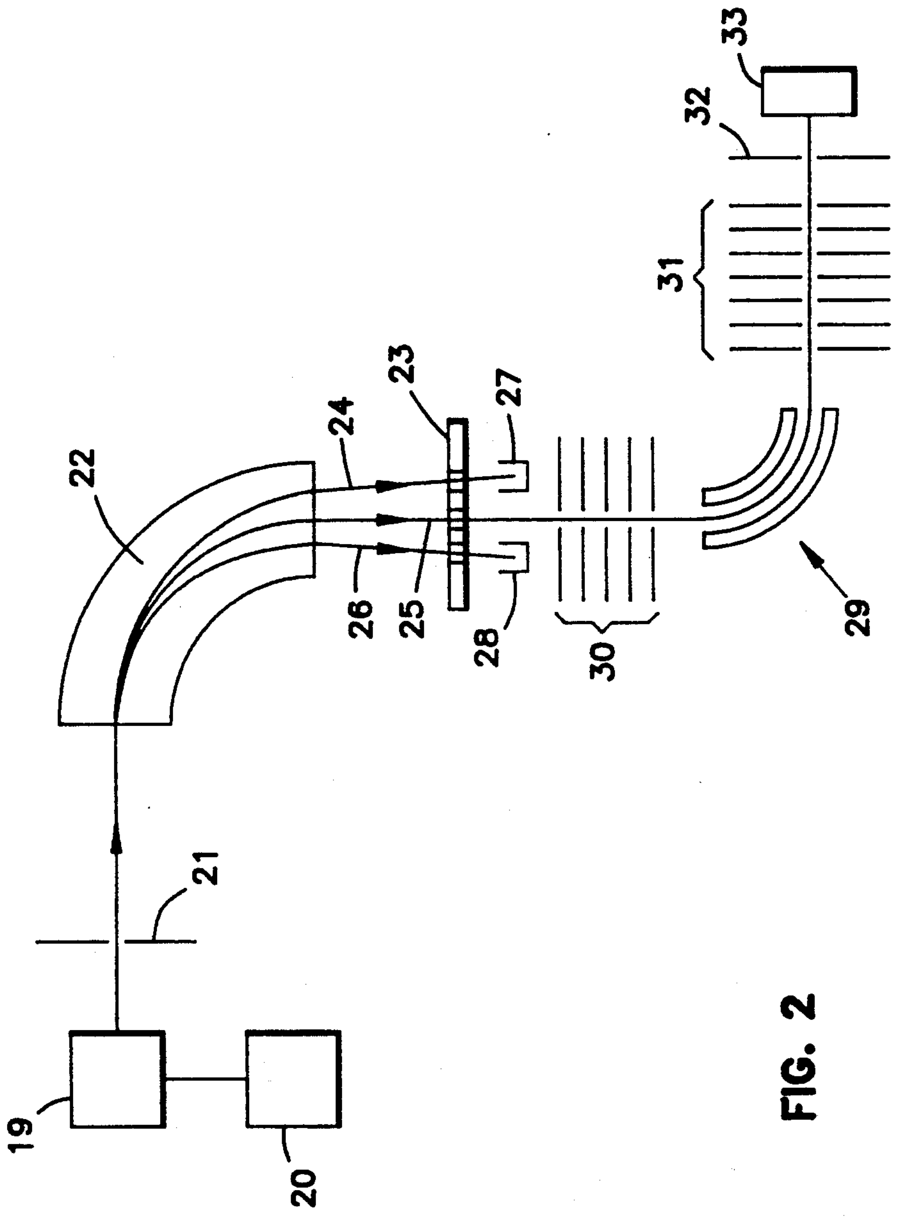
Figure 3B:
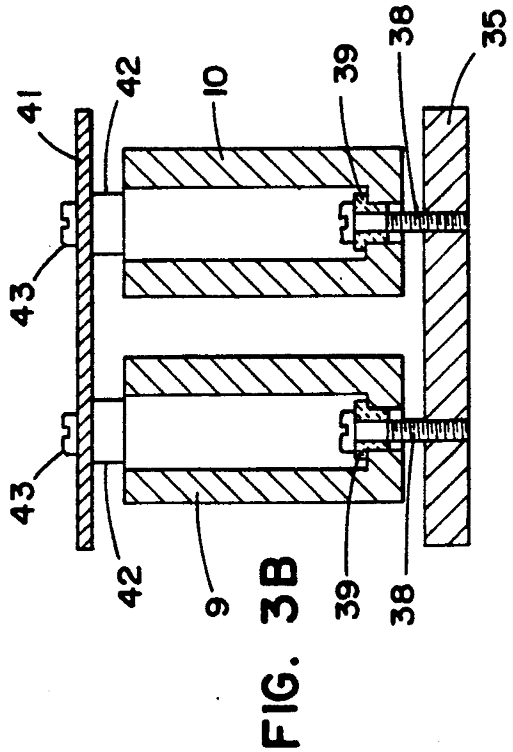
Figure 3C:
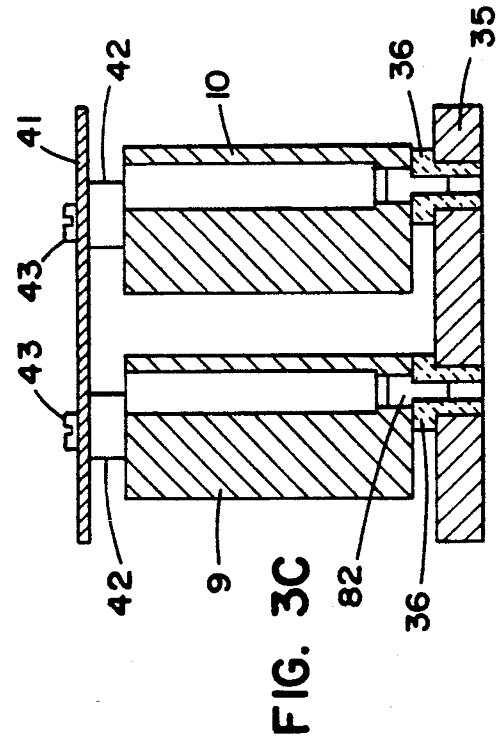
Figure 3A:
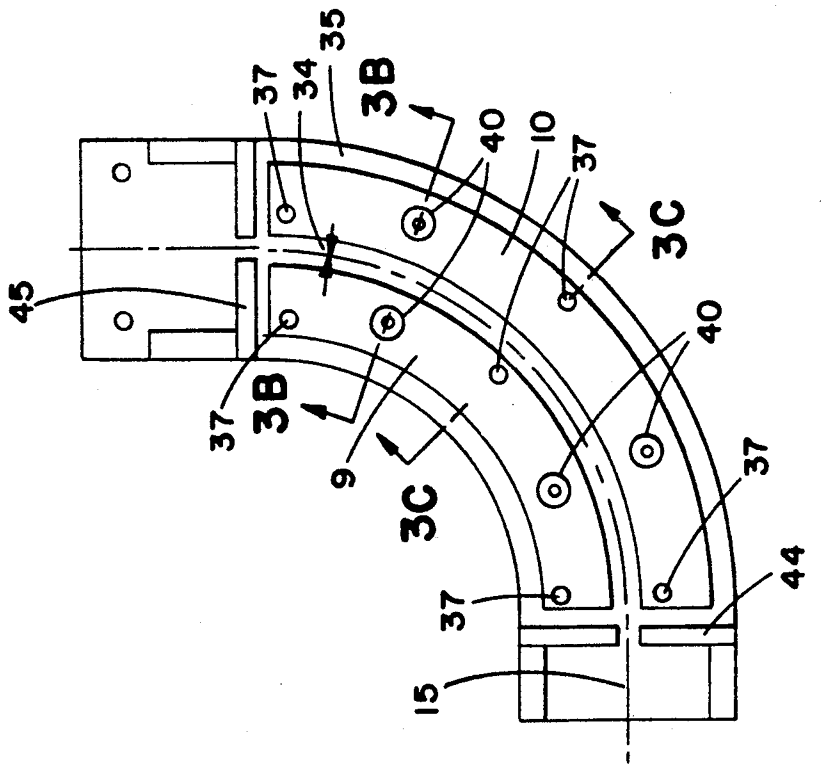
Figure 4:
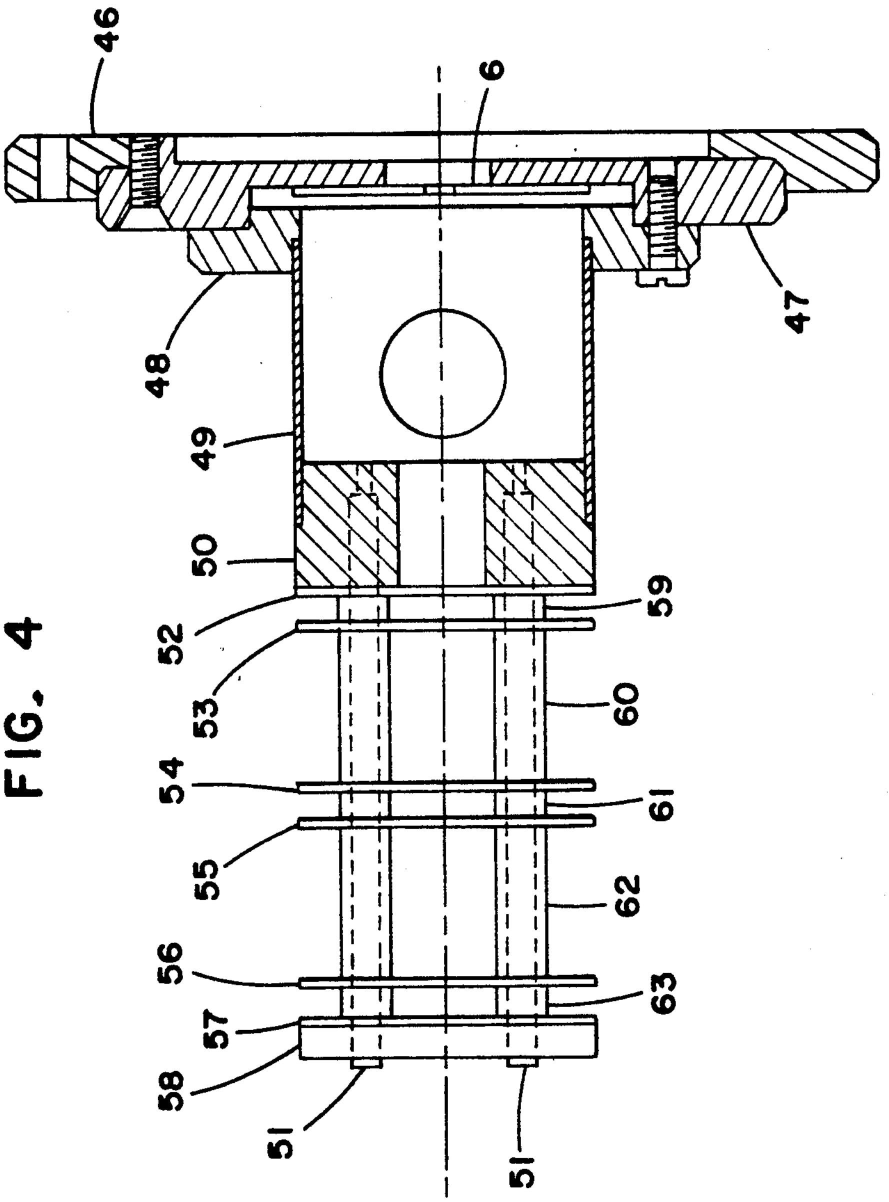
Figure 5:
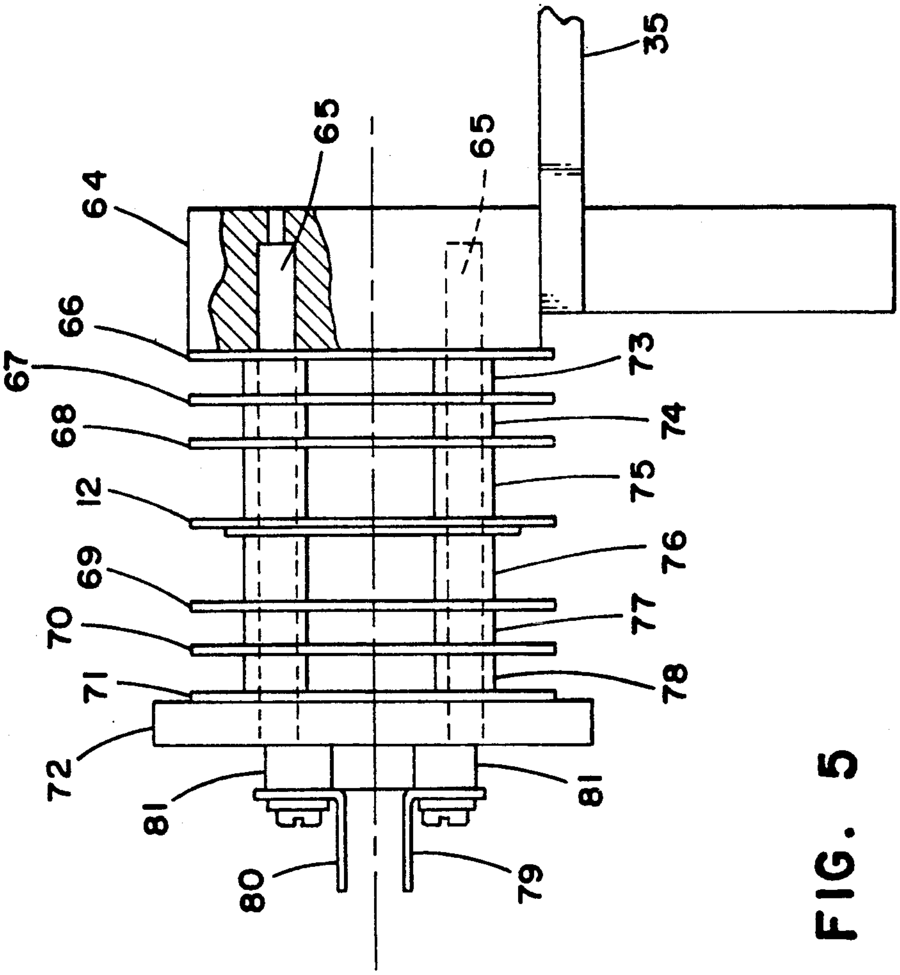

The invention will now be described in greater detail and by way of example only by reference to the figures, wherein:

FIG. 1 is a schematic diagram of one embodiment of a spectrometer according to the invention, FIG. 2 is a schematic diagram of another embodiment of a spectrometer according to the invention, FIGS. 3A–3C are drawings of an electrostatic sector analyzer suitable for use in the spectrometers of FIGS. 1 and 2, FIG. 4 is a drawing of a decelerating lens suitable for use in the spectrometers of FIGS. 1 and 2, and FIG. 5 is a drawing of an accelerating lens suitable for use in the spectrometers of FIGS. 1 and 2.

Referring first to FIG. 1, an ion source 1 of any type suitable for producing ions characteristic of a sample to be analyzed, is biased by an accelerating potential supply 2 to produce a beam of ions which is accelerated to a first kinetic energy by passage through an aperture in a grounded electrode 3. The ions are then decelerated to a second kinetic energy by means of the decelerating lens 4, the last element of which is maintained at a relatively high potential so that the ions acquire a second kinetic energy equivalent to the difference between the accelerating potential and the potential of the last element of lens 4. Typically, in this example, the accelerating potential may be +6000 volts and the potential of the last element of lens 4 may be +4800 volts, so that positive ions acquire a first kinetic energy of 6000 cV and subsequently a second kinetic energy of 1200 eV. A lens power supply 5 supplies the necessary potentials to the decelerating lens 4, which is also arranged to direction focus the beam of ions on to an entrance slit 6, maintained at the same potential as the last element of the lens 4. The decelerated ion beam then passes through an electrostatic analyzing means generally indicated by 8, in this embodiment a conventional 90° cylindrical sector analyzer comprising two sector electrodes 9, 10 between which a difference in potential is maintained by a power supply 7.

In accordance with the invention, power supply 7 is floated by power supply 5 so that the central trajectory 15 of the analyzer is maintained at the same potential as that of the entrance slit 6. and maintains the potential difference between electrodes 9 and 10 (i.e., the field strength) at the value necessary for ions having the second kinetic energy to be deflected round the central trajectory 15.

Ions leaving the analyzing means 8 pass into the acceleration lens 11 and through the energy selecting slit 12 which is maintained at ground potential. The analyzing means 8 produces an image 16 between the sector electrodes 9 and 10 and the first element of the acceleration lens 11, and another image is formed at the point 17 by the first portion of lens 11. The potential of the final element of the acceleration lens 11 is grounded, so that the ions leaving it acquire the first kinetic energy (6000 eV in this example).

Ideally, the energy selection slit 12 should be located at the image point 17, but in the embodiment shown this is impractical. The displacement shown in FIG. 1 has in practice very little effect on the overall performance of the spectrometer.

Ions passing through the last element of the acceleration lens 16 enter a conventional 90° magnetic sector analyzing means 18 which has a grounded flight tube. In order to obtain high dispersion, this has a large radius (54 cm). Mass dispersed ions are focused on a collector slit 13 by the magnetic sector analyzing means and ions of a selected mass-to-charge ratio pass through the slit 13 to an ion detector 14 which comprises a Faraday cage type detector or an electron multiplier. The portion of the spectrometer comprising items 13, 14 and 18 is conventional and need not be described in detail. In the case of an isotopic-ratio spectrometer the detector system will typically comprise several collectors disposed to receive simultaneously ions of several mass-to-charge ratios.

In the FIG. 1 embodiment the overall energy dispersion of the electrostatic analyzing means 8 and its associated deceleration lens 4 and acceleration lens 11 is selected to equal the energy dispersion of the magnetic sector analyzer 18 in the manner previously described so that the complete spectrometer is double-focusing. Other parameters may also be selected to minimize important aberrations as is done in the design of more conventional double-focusing spectrometers although this is not generally possible to the same extent with a spectrometer according to the invention as it is with conventional spectrometers. It is not necessary, however, for an isotopic-ratio spectrometer according to the invention to have very high mass resolution. As explained, abundance sensitivity and high mass dispersion are the most important performance parameters.

It will be understood that in some cases it is possible to avoid the need to accelerate the ions to a first kinetic energy and immediately decelerate them to a second, lower, kinetic energy if the potentials of the electrodes between the ion source means 1 and the entrance slit 6 are arranged differently. However, lens 4 must also efficiently transmit ions from the source means to slit 6 and focus an image of the exit aperture of the source on the slit 6. The inventor has found that the arrangement of potentials shown provides the best results in practice, possibly because the presence of a grounded aperture close to the ion source means exit aperture results in the maximum efficiency of extraction of ions from the source.

Referring next to FIG. 2 an alternative embodiment of a spectrometer according to the invention comprises ion source means 19 maintained at a high potential by the accelerating potential supply 20. Ions formed in the source means 19 are accelerated to a first kinetic energy as they pass through a grounded source aperture 21 and enter a 90° magnetic sector analyzing means 22. Analyzing means 22 disperses the ions according to their mass-to-charge ratios and focuses ions of three different mass-to-charge ratios to different points in a magnet focal plane 23 along the trajectories 24, 25 and 26 respectively. Of these ions having the lowest and highest masses pass through apertures in a grounded electrode disposed in the plane 23 and are collected in the Faraday cages 27, 28 respectively. Items 19–22 and 27, 28 are the major components of a conventional multicollector isotopic-ratio mass spectrometer, and are well known. In the spectrometer of FIG. 2, however, the central Faraday cage which in a conventional spectrometer would receive ions travelling along trajectory 25, is replaced by a deceleration lens 30, electrostatic analyzer means 29 and an acceleration lens 31, thereby providing filtration of the ions travelling along trajectory 25 before they pass through the final collector slit 32 and are received by the detector 33. Detector 33 may comprise a Faraday cage or electron multiplier as appropriate. In accordance with the invention, the deceleration lens 30 reduces the kinetic energy of the ions from the first kinetic energy (at which they leave the magnetic sector analyzer 22) to a second, lower, kinetic energy. As in the spectrometer of FIG. 1, the last element of the deceleration lens 30 and the central trajectory of the electrostatic analyzing means 29 are both maintained at the potential which corresponds to the difference in the first and second kinetic energies.

It will be appreciated that if the second kinetic energy is not too low (e.g., if it is greater than about 1000 eV) it is possible to omit the acceleration lens 31 and receive the ions directly in the detector 33 through the final collector slit.

Although it is a preferred embodiment of the invention for the magnetic sector analyzing means 22 to cooperate with the electrostatic analyzing means 29 to provide double focusing, this is not essential. In the FIG. 2 embodiment the electrostatic analyzing means 29 is located after the final collector slit (in the plane 23) of the magnetic sector analyzing means 22, as it is the case of some of the prior types of isotopic-ratio spectrometers discussed previously. In these spectrometers, it is only necessary for the electrostatic analyzer to provide energy filtration of the ions and it is not necessary (or even practical) for the combination of the analyzers to be double focusing.

It is also within the scope of the invention to replace the magnetic sector analyzing means 22 in FIG. 2 with other types of mass analyzer incorporating one or more magnetic sector analyzers. For example, the single magnetic sector may be replaced by a complete double-focusing spectrometer comprising a magnetic and an electrostatic sector, or by a tandem arrangement of two magnetic sectors.

FIGS. 3A–3C are drawings of a preferred construction of the electrostatic analyzing means 8 or 29. Inner and outer cylindrical 90° sector electrodes 9 and 10 are disposed as shown in the plan view of FIG. 3A with a gap 34 of constant width between them. Electrodes 9 and 10 are spaced from a mounting plate 35 by means of ceramic insulators 36 (FIG. 3C) at the points 37 (FIG. 3A), and are maintained in position by dowels 82 which locate in the insulators 36 (FIG. 3C). The electrodes are secured by screws 38 and ceramic insulators 39 (FIG. 3B) at points 40 (FIG. 3A). A field-correcting plate 41 (FIGS. 3B and 3C) is secured to the upper surfaces of electrodes 9 and 10 by means of screws 43 and insulators 42. Also mounted from the baseplate 35 are the fringe-field correction electrodes 44, 45. Baseplate 35, field-correcting plate 41 and the fringe-field correction electrodes 44 and 45 are all maintained at the potential of the central trajectory 15. The arrangement allows the complete assembly shown in FIG. 3A to be mounted inside a grounded vacuum enclosure (not shown) on suitable insulators supporting the baseplate 35. In this way the baseplate 35, field-correcting plate 41 and the fringe-field correction electrodes 44, 45 define a substantially field-free region at a potential other than ground wherein the analyzing field (due to the difference in potential of electrodes 9 and 10) is situated, so that ions entering the analyzer acquire the kinetic energy equivalent to the difference in potential of the point at which they are formed and the potential of items 35, 41, 44 and 45, and are analyzed at this kinetic energy. As explained, in a typical application the potential of the ion source means 1 or 19 is +6000 volts and the potential at which items 35, 41, 44 and 45 are maintained is +4800 volts.

The construction of a suitable decelerating lens 4 is illustrated in FIG. 4. The lens electrodes are supported from an insulating flange 46 which is counterbored to receive an entrance slit mounting flange 47 which in turn supports a thin entrance slit 6. The insulating flange 46 is attached to the vacuum housing in which the electrostatic analyzer is disposed and permits the slit 6 to be maintained at a high potential with respect to ground in order that the ions acquire appropriate kinetic energy as they enter the analyzer. The flange 47 supports a third flange 48 and a lens spacing tube 49 in which is fitted a rod support member 50. Four ceramic rods 51 extend from the member 50 and carry six lens electrodes 52–57 and a clamping ring 58. The six lens electrodes 52–57 are spaced apart on the rods 51 by tubular insulating spacers 59–63.

Ions enter the lens system through the electrode 57 which is maintained at ground potential and are focused by means of suitable potentials applied to electrodes 53–56 to form an image at the entrance aperture 6. Electrode 52, member 50, tube 49 and the flange 48 are all maintained at the potential of the central trajectory 15 of the electrostatic analyzing means. The slit 6 also serves as a differential pumping aperture between the vacuum housing containing the electrostatic analyzing means and the vacuum housing containing the ion source and lens system, which are separately pumped. Electrodes 54 and 55 may each comprise a pair of "half" electrodes between which a small differential potential may be applied to steer the ion beam accurately into the entrance slit 6.

The construction of a suitable acceleration lens 11 or 31 is shown in FIG. 5. A rod support member 64 is secured to an extension of the baseplate 35 of the electrostatic analyzing means (see also FIG. 3A). Four ceramic rods 65 are fitted into the member 64 and support three lens electrodes 66–68, the energy selection slit 12, three further lens electrodes 69–71 and a clamping ring 72. These components are spaced apart by tubular insulators 73–78 as shown. The clamping ring 72 carries two 'z' deflection electrodes 79, 80 which are mounted on four insulated supports 81. The lens power supply 5 maintains the electrode 60 at the same potential as the baseplate 35 (and hence the same potential as the central trajectory 15). Electrodes 68, 69 and 71 are grounded, are the energy selection aperture 12 and the ring 72. The electrodes 67 and 70 are maintained by the lens power supply 5 at potentials which result in an image being formed approximately in the plane of electrode 70 (which in the case of the spectrometer shown in FIG. 1 is the "object point" of the succeeding magnetic sector analyzing means 18). The lens power supply 5 also provides a degree of "z" focusing by means of the potentials applied to the "z" deflector electrodes 79 and 80, and also permits "z" steering of the beam by adjustment of a potential difference between these electrodes.

It will be understood that in the case of the type of spectrometer shown in FIG. 2 wherein the electrostatic analyzing means 29 is the last analyzer prior to the detector, it is possible to omit the acceleration lens 31 providing that the second kinetic energy (that is, the energy at which the ions are transmitted through the analyzer) is high enough to maintain adequate sensitivity on the detector 33.

I claim:

1. A mass spectrometer comprising:

1) ion source means for producing ions characteristic of a sample to be analyzed;

2) ion detector means for receiving at least some of said ions;

3) magnetic sector analyzing means and electrostatic analyzing means disposed in any order between said ion source means and said ion detector means; wherein:

1) said magnetic sector analyzing means comprises means for dispersing ions according to their mass-to-charge ratios and for transmitting ions whose mass-to-charge ratios lie within a predetermined range and have a first kinetic energy;

2) said electrostatic analyzing means comprises means for generating an electrostatic field for deflecting ions having different kinetic energies around different curved trajectories such that:

a) ions having a second kinetic energy, lower than said first kinetic energy, are deflected around a central curved trajectory and transmitted through said electrostatic analyzing means, and b) the strength of said electrostatic field is substantially equal to the strength of a similar reference field multiplied by the ratio of said second and said first kinetic energies when the strength of said reference field is that necessary to deflect ions having said first kinetic energy around said central curved trajectory; and 4) means are provided prior to said magnetic sector analyzing means for changing the kinetic energy of ions to said first kinetic energy and prior to said electrostatic analyzing means for changing the kinetic energy of ions to said second kinetic energy.

2. A mass spectrometer according to claim 1 wherein said electrostatic analyzing means comprises an electrostatic sector analyzer having two curved electrodes such that the electrostatic field generated thereby is a radial field whose strength is defined by the potential difference between the two curved electrodes.

3. A mass spectrometer according to claim 1 wherein the potential of the central trajectory of the electrostatic analyzing means is greater than that of the magnetic sector analyzing means.

4. A mass spectrometer according to claim 1, wherein said electrostatic analyzing means and said magnetic sector analyzing means are arranged to co-operate to provide both energy and direction focusing of the ion beam.

5. A mass spectrometer according to claim 1 wherein said magnetic sector analyzing means comprises at least one magnetic sector analyzer and an electrostatic analyzer.

6. A mass spectrometer according to claim 1 further comprising lens means provided between the magnetic sector analyzing means and the electrostatic analyzing means.

7. A mass spectrometer according to claim 6 wherein said lens means are electrostatic.

8. A mass spectrometer comprising:

1) ion source means for producing ions characteristic of a sample to be analyzed; said ion source means being maintained at a first potential with respect to ground;

2) ion detector means for receiving at least some of said ions;

3) magnetic sector analyzing means and electrostatic analyzing means disposed between said ion source means and said ion detector means; said electrostatic analyzer means preceding said magnetic sector analyzing means;

said magnetic sector analyzing means comprising means for dispersing ions according to their mass-to-charge ratios and for transmitting ions whose mass-to-charge ratios lie within a predetermined range and have a first kinetic energy, the entrance aperture of the magnetic sector analyzing means being maintained at substantially ground potential such that ions entering it from the electrostatic analyzing means acquire a first kinetic energy equivalent to the first potential; and said electrostatic analyzing means comprising means for generating an electrostatic field for deflecting ions having different kinetic energies around different curved trajectories, wherein:

a) the central trajectory of the electrostatic analyzing means is maintained at a second potential with respect to ground whereby ions entering it acquire a second kinetic energy lower than said first kinetic energy, equivalent to the difference between said first and second potentials whereby ions having said second kinetic energy are deflected around a central curved trajectory and transmitted through said electrostatic analyzing means, and b) the strength of said electrostatic field is substantially equal to the strength of a similar reference field multiplied by the ratio of said second and said first kinetic energies when the strength of said reference field is that necessary to deflect ions having said first kinetic energy around said central curved trajectory.

9. A mass spectrometer according to claim 8 wherein said electrostatic analyzing means comprises an electrostatic sector analyzer having two curved electrodes such that the electrostatic field generated thereby is a radial field whose strength is defined by the potential difference between the two curved electrodes.

10. A mass spectrometer according to claim 8 wherein the potential of the central trajectory of the electrostatic analyzing means is greater than that of the magnetic sector analyzing means.

11. A mass spectrometer according to claim 8, wherein said electrostatic analyzing means and said magnetic sector analyzing means are arranged to co-operate to provide both energy and direction focusing of the ion beam.

12. A mass spectrometer according to claim 8 wherein said magnetic sector analyzing means comprises at least one magnetic sector analyzer and an electrostatic sector analyzer.

13. A mass spectrometer according to claim 8 further comprising lens means provided between the magnetic sector analyzing means and the electrostatic analyzing means.

14. A mass spectrometer according to claim 13 wherein said lens means are electrostatic.

15. A mass spectrometer comprising:

1) ion source means for producing ions characteristic of a sample to be analyzed; said ion source means being maintained at a first potential with respect to ground;

2) ion detector means for receiving at least some of said ions;

3) magnetic sector analyzing means and electrostatic analyzing means disposed in that order between said ion source means and said ion detector means;

said magnetic sector analyzing means comprising means for dispersing ions according to their mass-to-charge ratios and for transmitting ions whose mass-to-charge ratios lie within a predetermined range and have a first kinetic energy; the entrance aperture of the magnetic sector analyzing means being maintained at substantially ground potential such that ions entering it from the ion source acquire a first kinetic energy equivalent to the first potential;

said electrostatic analyzing means comprising means for generating an electrostatic field for deflecting ions having different kinetic energies around different curved trajectories wherein:

a) the central trajectory of the electrostatic analyzing means is maintained at a second potential with respect to ground whereby ions entering it from said magnetic sector analyzing means are decelerated to a second kinetic energy lower than said first kinetic energy, equivalent to the difference between said first and said second potentials whereby ions having said second kinetic energy are deflected around a central curved trajectory and transmitted through said electrostatic analyzing means, and b) the strength of said electrostatic field is substantially equal to the strength of a similar reference field multiplied by the ratio of said second and said first kinetic energies when the strength of said reference field is that necessary to deflect ions having said first kinetic energy around said central curved trajectory.

16. A mass spectrometer according to claim 15 wherein said electrostatic analyzing means comprises an electrostatic sector analyzer having two curved electrodes such that the electrostatic field generated thereby is a radial field whose strength is defined by the potential difference between the two curved electrodes.

17. A mass spectrometer according to claim 15 wherein the potential of the central trajectory of the electrostatic analyzing means is greater than that of the magnetic sector analyzing means.

18. A mass spectrometer according to claim 15, wherein said electrostatic analyzing means and said magnetic sector analyzing means are arranged to cooperate to provide both energy and direction focusing on the ion beam.

19. A mass spectrometer according to claim 15 wherein said magnetic sector analyzing means comprises at least one magnetic sector analyzer and an electrostatic sector analyzer.

20. A mass spectrometer according to claim 15 further comprising lens means provided between the magnetic sector analyzing means and the electrostatic analyzing means.

21. A mass spectrometer according to claim 20 wherein said lens means are electrostatic.

* * * * *